United States Patent
Kan et al.

(10) Patent No.: US 7,638,223 B2
(45) Date of Patent: Dec. 29, 2009

(54) FUEL CELL

(75) Inventors: Hirofumi Kan, Tokyo (JP); Asako Satoh, Yokohama (JP); Akira Yajima, Tokyo (JP); Yumiko Takizawa, Yokohama (JP); Hiroyuki Shiroki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/836,821

(22) Filed: Aug. 10, 2007

(65) Prior Publication Data

US 2009/0011321 A1 Jan. 8, 2009

Related U.S. Application Data

(63) Continuation of application No. PCT/JP2006/302376, filed on Feb. 10, 2006.

(30) Foreign Application Priority Data

Feb. 10, 2005 (JP) ............................. 2005-034610

(51) Int. Cl.
*H01M 4/00* (2006.01)

(52) U.S. Cl. ........................................ 429/34; 429/40

(58) Field of Classification Search ................ 429/34, 429/40
See application file for complete search history.

(56) References Cited

U.S. PATENT DOCUMENTS

2002/0192537 A1* 12/2002 Ren .............................. 429/44

2004/0101741 A1 5/2004 Minteer et al.

FOREIGN PATENT DOCUMENTS

| CN | 1386308 A | 12/2002 |
|---|---|---|
| EP | 1 304 753 A1 | 4/2003 |
| EP | 1 306 913 | 5/2003 |
| EP | 1 320 140 A1 | 6/2003 |
| JP | 6-52871 | 2/1994 |
| JP | 2002-25565 | 1/2002 |
| JP | 2002-63912 | 2/2002 |
| JP | 2002-373677 | 12/2002 |
| JP | 3413111 | 3/2003 |
| JP | 2004-6266 | 1/2004 |
| JP | 2004-6335 | 1/2004 |
| JP | 2005-310714 | 11/2005 |
| KR | 2002-0042702 | 6/2002 |
| WO | WO 02/13297 A1 | 2/2002 |

OTHER PUBLICATIONS

U.S. Appl. No. 11/837,071, filed Aug. 10, 2007, Kan et al.
U.S. Appl. No. 11/720,149, filed May 24, 2007, Negishi et al.
U.S. Appl. No. 11/576,693, filed Apr. 5, 2007, Negishi et al.
U.S. Appl. No. 11/863,725, filed Sep. 28, 2007, Satoh et al.

* cited by examiner

*Primary Examiner*—Jane Rhee
(74) *Attorney, Agent, or Firm*—Oblon, Spivak, McClelland, Maier & Neustadt, L.L.P.

(57) ABSTRACT

A fuel cell comprising a cathode catalyst layer, an anode catalyst layer including a conductive perfluoro-binder having a micellar structure formed by outwardly orienting hydrophobic (lipophilic) groups and inwardly orienting hydrophilic groups, and a proton conductive membrane provided between the cathode catalyst layer and the anode catalyst layer.

20 Claims, 1 Drawing Sheet

FUEL CELL

CROSS REFERENCE TO RELATED APPLICATIONS

This is a Continuation Application of PCT Application No. PCT/JP2006/302376, filed Feb. 10, 2006, which was published under PCT Article 21(2) in Japanese.

This application is based upon and claims the benefit of priority from prior Japanese Patent Application No. 2005-034610, filed Feb. 10, 2005, the entire contents of which are incorporated herein by reference.

BACKGROUND OF THE INVENTION

1. Field of the Invention

The invention relates to a fuel cell in which a liquid fuel or a vaporized fuel obtained by vaporizing the liquid fuel is supplied to an anode catalyst layer.

2. Description of the Related Art

In recent years, various types of electronic devices such as personal computers and mobile telephones have been reduced in size as the semiconductor technology advances, and there have been attempts in which a fuel cell is used as the power source of a small-sized device. A fuel cell has such advantages that it can generate electrical power merely by supplying the fuel and oxidizer thereto, and it can continuously generate power merely by replacing the fuel. Therefore, when the downsizing can be achieved, it would create an extremely advantageous system for the operation of mobile electronic devices. Especially, the direct methanol fuel cell (DMFC) uses methanol having a high energy density as its fuel and can generate an electrical current on the electrode catalyst from methanol. Thus, this cell does not require a reformer, and therefore it can be reduced in size. Since the handling of the fuel is easy as compared to that of a hydrogen gas fuel, it is a hopeful power source for small-sized devices.

Known methods for supplying the fuel of DMFC include a gas supplying DMFC for sending a liquid fuel into the fuel cell with a blower or the like after vaporizing the liquid fuel, a liquid supplying DMFC for directly sending a liquid fuel into the fuel cell with a pump or the like, and an internal-vaporization DMFC as shown in Japanese Patent No. 3413111. The internal-vaporization DMFC discloses a fuel penetration layer which retains the liquid fuel and a fuel transmitting layer that diffuses vaporized components of the liquid fuel retained in the fuel penetration layer, and has such a structure that the vaporized components of the liquid fuel is supplied from the fuel transmitting layer to the fuel electrode.

However, since the conductive perfluoro-binder contained in the anode catalyst layer is swelled with a methanol fuel and evokes structural changes, durability of DMFC is remarkably poor as compared with a fuel cell using a hydrogen gas fuel.

BRIEF SUMMARY OF THE INVENTION

An object of the invention is to provide a fuel cell having improved durability by improving chemical stability of the conductive perfluoro-binder contained in the anode catalyst layer.

According to an aspect of the present invention, there is provided a fuel cell comprising:

a cathode catalyst layer;

an anode catalyst layer including a conductive perfluoro-binder having a micellar structure formed by outwardly orienting hydrophobic (lipophilic) groups and inwardly orienting hydrophilic groups; and a proton conductive membrane provided between the cathode catalyst layer and the anode catalyst layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

BRIEF DESCRIPTION OF DRAWINGS

Figure 1:
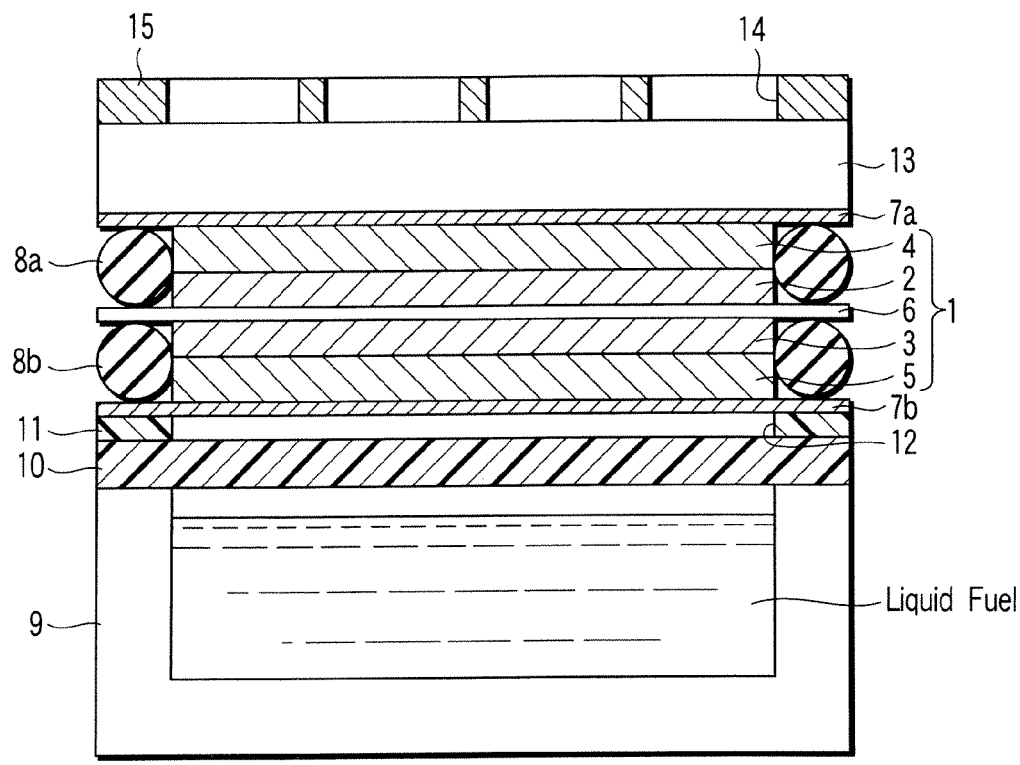

FIG. 1 is a schematic cross section showing a direct methanol fuel cell according to an embodiment of the invention.

Figure 2:
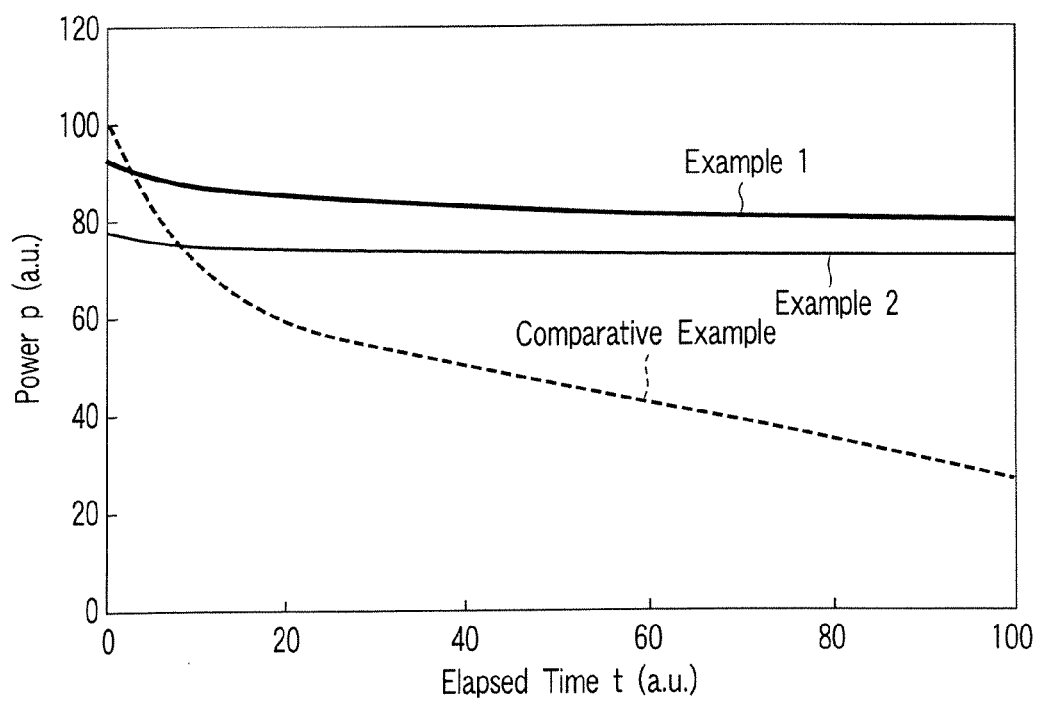

FIG. 2 is a characteristics diagram showing the time-dependent changes of the power of direct methanol fuel cells in Examples 1 and 2 and Comparative Example.

DETAILED DESCRIPTION OF THE INVENTION

In order to solve the problems described above, the inventors of the invention have investigated, through intensive studies, that chemical stability of a conductive perfluoro-binder against a methanol fuel is related to a micellar structure of the binder, and found that chemical stability of the conductive perfluoro-binder against the methanol fuel is improved when the binder has a micellar structure formed by outwardly orienting hydrophobic (lipophilic) groups and inwardly orienting hydrophilic groups (referred to as an inverse micellar structure hereinafter), and that the binder is suppressed from being dissolved even when the concentration of methanol in the fuel is high.

That is, since adhesiveness between the anode catalyst layer and proton conductive membrane may be maintained at even a higher concentration of methanol in the fuel by using the anode catalyst layer containing the conductive perfluoro-binder having the inverse micellar structure, time-dependent stability of the output voltage may be enhanced and excellent stability is obtained when the methanol concentration in the fuel is increased.

The anode catalyst layer will be described first.

Examples of the catalyst contained in the anode catalyst layer (referred to as an anode catalyst hereinafter) include pure metals of the platinum group element (such as Pt, Ru, Rh, Ir, Os and Pd) and alloys containing the platinum group element. While the anode catalyst preferably contains a Pt—Ru alloy highly resistant to methanol and carbon monoxide, the catalyst is not restricted thereto. A supported catalyst using a conductive support such as a carbon material or a non-supported catalyst may be used.

Examples of the conductive perfluoro-binder include fluorinated resins having sulfonic acid groups (for example, perfluoro-sulfonic acid polymers). An example of the perfluoro-sulfonic acid polymer is shown by the following chem 1.

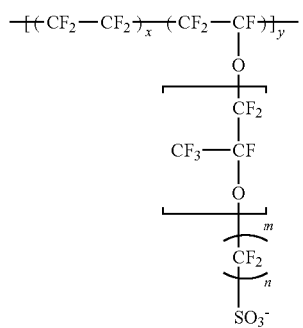

[chem 1]

where chem 1, x, y, m and n are integers satisfying the relations of x>0, y>0, m≧0 and n≧0, respectively.

When the resin is represented by chem 1, the perfluoroalkyl group $[(CF_2CF_2)_x—(CF_2CF)]_y$ represents a hydrophobic (lipophilic) group while $\{(CF_2)_n—SO_3—\}$ represents a hydrophilic group.

The conductive perfluoro-binder such as the perfluorosulfonic acid polymer forms a stable micelle in a solution by outwardly orienting the hydrophilic group and inwardly orienting the hydrophobic (lipophilic) group (referred to as a micellar structure hereinafter). The micelle starts to be converted into an inverted micellar structure by drying with heating at a temperature of 120° C. or more, and the inverted micellar structure is stabilized at a temperature of above 135° C. It is possible to convert the micelle into the inverse micellar structure at a lower temperature under a reduced pressure.

The anode catalyst layer containing the conductive perfluoro-binder having the inverse micellar structure is prepared, for example, by the method described below. A solution of the conductive perfluoro-binder, water and an organic solvent such as methoxy propanol are added to the anode catalyst, and mixed to prepare a paste. The paste obtained is applied on porous carbon paper as an anode gas diffusion layer, and the paste is dried and subjected to heat treatment to form an anode catalyst layer on the anode gas diffusion layer.

The concentration of the solution of the conductive perfluoro-binder is desirably in the range from 10% by weight or more to 70% by weight or less, more preferably from 30% by weight or more to 50% by weight or less for the following reason. Control of the viscosity of the paste is difficult and paintability of the paste may be decreased when the concentration of the binder solution is less than 10% by weight or exceeds 70% by weight.

The blending ratio of the anode catalyst and binder solution is desirably adjusted so that the content of the anode catalyst in the anode catalyst layer is in the range from 5% by weight or more to 50% by weight or less, more preferably from 10% by weight or more to 30% by weight or less, and the content of the conductive perfluoro-binder is in the range from 1% by weight or more to 20% by weight or less, more preferably from 5% by weight or more to 15% by weight or less for the following reason. The bond strength between the anode catalyst layer and the proton conductive membrane may be decreased when the content of the anode catalyst is larger than the above-mentioned range or the content of the binder is smaller than the above-mentioned range. Further, the reaction resistance in the internal reforming reaction of methanol may be increased when the content of the anode catalyst is smaller or the content of the binder is larger than the above-described range.

The anode catalyst layer containing the conductive perfluoro-binder having the micellar structure is obtained by setting the concentration of the conductive perfluoro-binder solution and the contents of the anode catalyst and conductive perfluoro-binder within the above-described ranges.

The binder may be transformed into the inverse micellar structure by subjecting the anode catalyst layer to heat treatment at a temperature exceeding 135° C. to 240° C. or less, preferably from 180 to 200° C., under a normal pressure atmosphere, and the anode catalyst layer containing the conductive perfluoro-binder having the inverse micellar structure is obtained. While transition to the inverse micellar structure is facilitated at a higher temperature as described above, the heat treatment temperature is desirably within the above-mentioned range since the binder may be decomposed by heat when the heat treatment temperature is high.

The conductive perfluoro-binder having the inverse micellar structure has low solubility in methanol. Accordingly, it may be confirmed that the conductive perfluoro-binder having the inverse micellar structure is contained in the anode catalyst layer when weight loss of the anode catalyst layer is 10% or less after immersing the layer in 100% by weight of a methanol solution kept at 25° C. for 24 hours.

It is desirable to use a granular carbon material, a fibrous carbon material or a composite material of carbon material and fibrous carbon material as disclosed in Jpn. Pat. Appln. KOKAI Publication No. 2005-310714 for the conductive support of the anode catalyst layer. Since weight loss of the anode catalyst layer after immersing it in methanol under the above-mentioned condition may be appropriately increased within the range of 10% or less by using the above-mentioned carbon material, chemical stability of the anode catalyst against the methanol fuel may be improved while proton conductivity is secured. Examples of the fibrous carbon material in the composite material described in Jpn. Pat. Appln. KOKAI Publication No. 2005-310714 include carbon nanofibers having a herringbone structure or a platelet structure. Examples of the carbon material include carbon black particles.

The cathode catalyst layer will be described below.

The cathode catalyst layer contains a cathode catalyst and a proton conductive binder.

Examples of the cathode catalyst include pure metals of the platinum group element (Pt, Ru, Rh, Ir, Os and Pd), and alloys containing the platinum group element. While platinum is preferably used for the cathode catalyst, the material is not restricted thereto. Either a supported catalyst using a conductive support such as a carbon material or a non-supported catalyst may be used.

While examples of the proton conductive binder include conductive perfluoro-binders (for example, fluorinated resins having sulfonic acid groups such as perfluorosulfonic acid polymers), hydrocarbon resins having the sulfonic acid group, and inorganic compounds such as tungstic acid and phosphorus wolframate, the material is not restricted thereto. The conductive perfluoro-binder is preferable among them.

The conductive perfluoro-binder may have either the micellar structure or the inverse micellar structure.

Since proton conductivity of the cathode can be improved by using the binder having the micellar structure, long term stability as well as maximum power may be improved. Chemical stability of the cathode catalyst layer is improved by using the conductive perfluoro-binder having the inverse micellar structure.

The micelle of the conductive perfluoro-binder in the cathode catalyst layer has the inverse micellar structure when the weight loss of the cathode catalyst layer is 10% or less after immersing the cathode catalyst layer in 100% by weight of a methanol solution maintained at 25° C. for 24 hours, while the micelle has the micellar structure when the weight loss exceeds 10%.

The cathode catalyst layer is manufactured by the method described below.

A paste is prepared by adding the conductive perfluoro-binder solution, water and an organic solvent such as methoxy propanol to the cathode catalyst with mixing. The paste obtained is applied on porous carbon paper as a cathode gas diffusion layer, and dried to form the cathode catalyst layer on the cathode gas diffusion layer.

The concentration of the conductive perfluoro-binder solution is desirably in the range from 10% by weight or more to 70% by weight or less for the following reason. The viscosity of the paste is hardly controlled and paintability of the paste may be decreased when the concentration of the binder solution is less than 10% by weight or exceeds 70% by weight.

Desirably, the amounts of blending of the cathode catalyst and conductive perfluoro-binder solution are adjusted so that the content of the cathode catalyst in the cathode catalyst layer is in the range from 5% by weight or more to 50% by weight or less, more preferably from 10% by weight or more to 30% by weight or less, and the content of the conductive perfluoro-binder in the cathode catalyst layer is in the range from 1% by weight or more to 20% by weight or less, more preferably from 5% by weight or more to 15% by weight or less for the following reason. The bond strength between the cathode catalyst layer and the proton conductive membrane may be decreased when the content of the cathode catalyst is larger than the above-mentioned range or the content of the binder is smaller than the above-mentioned range. Further, the reaction resistance of the power generating reaction may be increased when the content of the cathode catalyst is small or the content of the binder is large.

The cathode catalyst layer containing the conductive perfluoro-binder having the micellar structure is obtained by adjusting the concentration of the conductive perfluoro-binder solution and the contents of the cathode catalyst and conductive perfluoro-binder in the above-mentioned ranges.

The cathode catalyst layer is converted into the inverse micellar structure by heat treatment at a temperature exceeding 135° C. to 240° C. or less, more preferably from 180 to 200° C. under a normal pressure atmosphere, and the cathode catalyst layer containing the conductive perfluoro-binder having the inverse micellar structure is obtained. While the cathode catalyst layer is readily converted into the inverse micellar structure at a higher temperature, the heat treatment temperature is desirably within the above-mentioned range since the binder is decomposed by heat when the heat treatment temperature is increased.

It is desirable to use the granular carbon material, fibrous carbon material or composite material as described in the anode catalyst layer for the conductive support of the cathode catalyst layer. Since the structure of the cathode catalyst layer is highly stabilized by using such a conductive support, the weight loss of the heat-treated cathode may be reduced when it is immersed in methanol under the above-described condition, and chemical stability of the cathode may be improved.

Since the chemical stability against the methanol fuel is reduced according to the invention, the invention is favorably applied for the fuel cell using a methanol-containing fuel. The vaporizable components of the methanol-containing fuel may be supplied to the anode catalyst layer, or the fuel may be supplied to the anode catalyst layer as the liquid itself. In particular, the time-dependent stability of the power may be largely improved when the methanol concentration of the fuel is high.

Examples of the methanol-containing fuel include an aqueous methanol solution and pure methanol. The concentration of methanol in the aqueous methanol solution is desirably as high as more than 50 mol %. The purity of pure methanol is desirably in the range from 95 to 100% by weight. A fuel cell having high time-dependent stability of the power and being excellent in power performance may be provided when the methanol concentration or purity is in the above-mentioned range.

The direct methanol fuel cell as an embodiment of the fuel cell according to the invention will be described below with reference to the drawings.

FIG. 1 is a schematic cross section showing the direct methanol fuel cell according to an embodiment of the invention.

As shown in FIG. 1, a membrane electrode assembly (MEA) 1 includes a cathode composed of a cathode catalyst layer 2 and a cathode gas diffusion layer 4, an anode composed of an anode catalyst layer 3 and an anode gas diffusion layer 5, and a proton conductive electrolyte membrane 6 disposed between the cathode catalyst layer 2 and the anode catalyst layer 3.

While examples of the proton conductive material constituting the proton conductive electrolyte membrane 6 include fluorinated resins having sulfonic acid groups (for example a polymer of perfluorosulfonic acid), hydrocarbon resins having sulfonic acid groups, and inorganic compounds such as tungstic acid and phosphorus wolframate, the material is not restricted thereto.

The cathode catalyst layer 2 is laminated on the cathode gas diffusion layer 4, and the anode catalyst layer 3 is laminated on the anode gas diffusion layer 5. While the cathode gas diffusion layer 4 serves for evenly supplying an oxidant to the cathode catalyst layer 2, the cathode gas diffusion layer 4 also serves as a current collector of the cathode catalyst layer 2. On the other hand, the anode gas diffusion layer 5 serves for evenly supplying the fuel to the anode catalyst layer 3 while it also serves as a current collector of the anode catalyst layer 3. A cathode conductive layer 7a and an anode conductive layer 7b are in contact with the cathode gas diffusion layer 4 and anode gas diffusion layer 5, respectively. A porous layer (for example a mesh) made of a metal material such as gold may be used for the cathode conductive layer 7a and an anode conductive layer 7b.

A rectangular frame of a cathode seal member 8a is positioned between the cathode conductive layer 7a and the proton conductive electrolyte membrane 6, and surrounds the cathode catalyst layer 2 and cathode gas diffusion layer 4. On the other hand, a rectangular frame of an anode seal member 8b is positioned between the anode conductive layer 7b and the proton conductive electrolyte membrane 6, and surrounds the anode catalyst layer 3 and anode gas diffusion layer 5. The cathode seal member 8a and anode seal member 8b are O-rings provided for preventing the fuel and oxidant from leaking out of the membrane electrode assembly 1.

A liquid fuel tank 9 is placed under the membrane electrode assembly 1. The liquid fuel tank 9 is filled with pure methanol or an aqueous methanol solution. As a fuel transmitting layer 10, for example, a gas-liquid separation membrane 10 which permeates only the vaporized component of the liquid fuel and does not permeate the liquid fuel, is arranged at the opening end of the liquid fuel tank 9 so as to cover the opening of the liquid fuel tank 9. The vaporized component of the liquid fuel as used herein refers to vaporized methanol when pure methanol is used as the liquid fuel, while the vaporized component of the liquid fuel refers to a mixed gas containing the vaporized component of methanol and vaporized component of water when an aqueous methanol solution is used as the liquid fuel.

A resin frame 11 is laminated between the gas-liquid separation membrane 10 and the anode conductive layer 7b. The space surrounded by the frame 11 serves as a vaporized fuel container 12 (so-called vapor pool) for temporarily storing the vaporized fuel diffused through the gas-liquid separation membrane 10. A large quantity of the vaporized fuel is prevented from being supplied at once to the anode catalyst layer 3 by using the vaporized fuel container 12 and gas-liquid separation membrane 10. In other words, methanol crossover may be suppressed from occurring. The frame 11 is a rectangular frame made of a thermoplastic polyester resin such as PET.

A moisture retaining plate 13 is laminated on the cathode conductive layer 7a laminated on the membrane electrode assembly 1. A surface layer 15 having a plurality of air inlet ports 14 for importing air as the oxidant is laminated on the moisture retaining plate 13. Since the surface layer 15 also serves for enhancing adhesivity by compressing a stack including the membrane electrode assembly 1, the surface layer 15 is made of a metal such as SUS 304. The moisture retaining plate 13 serves for suppressing evaporation of water generated in the cathode catalyst layer 2 while the moisture retaining plate 13 serves as an auxiliary diffusion layer for enhancing uniform diffusion of the oxidant into the cathode catalyst layer 2 by uniformly introducing the oxidant into the cathode gas diffusion layer 4.

According to the direct methanol fuel cell so constructed as described above, the liquid fuel (for example, an aqueous methanol solution) in the liquid fuel tank 9 is vaporized, and vaporized methanol and water diffuse through the gas-liquid separation membrane 10. The vaporized gases are temporarily stored in the vaporized fuel container 12, and slowly supplied to the anode catalyst layer 3 by diffusing through the anode gas diffusion layer 5 from the container, so that the internal reforming reaction represented by reaction formula (1) is invoked.

$$CH_3OH+H_2O \rightarrow CO_2+6H^++6e^- \quad (1)$$

No water is supplied from the fuel transmitting layer when pure methanol is used as the liquid fuel. Accordingly, water generated by an oxidation reaction of methanol mingled into the cathode catalyst layer 2 or moisture contained in the proton conductive electrolyte membrane 6 reacts with methanol to evoke the internal reforming reaction represented by formula (1). Alternatively, some other internal reforming reaction different from that indicated by the formula (1) under a reaction mechanism in which water is not involved.

Proton ($H^+$) formed by the internal reforming reaction diffuses through the proton conductive electrolyte membrane 6 and arrives at the cathode catalyst layer 3. On the other hand, air imported from the air inlet port 14 of the surface layer 15 is supplied to the cathode catalyst layer 2 after diffusing through the moisture retaining plate 13 and cathode gas diffusion layer 4. In the cathode catalyst layer 2, the reaction represented by the following formula (2) takes place to generate water, and this is an electrical power generating reaction.

$$(3/2)O_2+6H^++6e^- \rightarrow 3H_2O \quad (2)$$

Water generated in the cathode catalyst layer 2 by the reaction represented by formula (2) or the like reaches the moisture retaining plate 13 after diffusing in the cathode gas diffusion layer 4 when the power generating reaction advances, and the amount of water stored in the cathode catalyst layer 2 increases since evaporation of water is prevented by the moisture retaining plate 13. Therefore, a state in which the amount of water held by the cathode catalyst layer 2 is larger than the amount of water held by the anode catalyst layer 3 occurs as the power generating reaction proceeds. Consequently, a reaction for transporting water generated in the cathode catalyst layer 2 to the anode catalyst layer 3 through the proton conductive electrolyte membrane 6 is accelerated by osmotic phenomenon. Thus, rate of water supply to the anode catalyst layer can be improved compared to the case of relying only on a fuel transmitting layer and the internal reforming reaction of methanol represented by formula (1) is facilitated. Therefore, the power density may be increased while the high power density is maintained for a long period of time.

Water diffused to the anode catalyst layer 3 from the cathode catalyst layer 2 is exclusively used for the internal reforming reaction when an aqueous methanol solution with a concentration exceeding 50 mol % or pure methanol is used as the liquid fuel, and water supply to the anode catalyst layer 3 is stabilized. Therefore, the reaction resistance of the internal reforming reaction of methanol may be further reduced to enable long term power performance and load current performance to be further improved. In addition, the size of the liquid fuel tank may be also reduced. The purity of pure methanol is desirably in the range from 95 to 100% by weight.

When the anode catalyst layer 3 contains the conductive perfluoro-binder having the inverse micellar structure, the binder may be suppressed from being dissolved into the methanol fuel even by using an aqueous methanol solution having a concentration exceeding 50 mol % or pure methanol as the liquid fuel, and adhesiveness between the anode catalyst layer 3 and the proton conductive membrane 6 may be maintained for a long period of time. Accordingly, a direct methanol fuel cell having high power density and being excellent in time-dependent stability may be provided.

When the liquid fuel is supplied to the anode catalyst layer, it is recommended that arranged are a separator having an oxidant flow passageway formed on the cathode gas diffusion layer 4 of the membrane electrode assembly 1 which has the same configuration as described in FIG. 1 and a separator having a liquid fuel flow passageway formed on the anode gas diffusion layer 5 of the membrane electrode assembly 1.

Examples of the invention will be described in detail below with reference to the drawings.

EXAMPLE 1

Preparation of Anode

A solution of perfluorocarbon sulfonic acid (8.5% by weight as converted into a solid fraction) with a concentration of 20% by weight, water and methoxy propanol were added to 17% by weight of spherical carbon black that retains an anode catalyst (Pt:Ru=1:1), and the catalyst-retaining carbon black was dispersed to prepare a paste. An anode catalyst layer was formed by applying the paste obtained on porous carbon paper as an anode gas diffusion layer to obtain an anode with a thickness of 450 μm.

An anode formed by laminating the anode catalyst layer on the anode gas diffusion layer was heat-treated at 180° C. for 30 minutes in a $N_2$ atmosphere. The cathode was then immersed in 100% by weight of a methanol solution kept at 25° C. for 24 hours, and the weight loss ratio of the anode catalyst layer was measured. It was confirmed from the measured ratio of 10% that perfluorocarbon sulfonic acid had an inverse micellar structure.

<Preparation of Cathode>

A solution of perfluorocarbon sulfonic acid (8.5% by weight as converted into a solid fraction) with a concentration of 20% by weight, water and methoxy propanol were added to 17% by weight of fibrous carbon black that retains a cathode catalyst (Pt), and the catalyst-retaining carbon black was dispersed to prepare a paste. A cathode catalyst layer was formed by applying the paste obtained on porous carbon paper as a cathode gas diffusion layer to obtain a cathode with a thickness of 400 μm.

A cathode formed by laminating the cathode catalyst layer on the cathode gas diffusion layer was immersed in 100% by weight of a methanol solution kept at 25° C. for 24 hours, and weight loss ratio of the cathode catalyst layer was measured. Since the weight loss ratio was 40%, it was confirmed that perfluorocarbon sulfonic acid had a micellar structure.

A perfluorocarbon sulfonic acid membrane (trade name: Nafion Membrane, manufactured by DuPont Co.) with a thickness of 60 μm and water content ratio from 10 to 20% by weight, as a proton conductive electrolyte membrane, was interposed between the anode catalyst layer and the cathode catalyst layer. The perfluorocarbon sulfonic acid membrane was subjected to hot-press with heating at a temperature of 115° C. in the vicinity of the membrane to obtain a membrane electrode assembly (MEA).

A polyethylene porous film with a thickness of 500 μm, an air permeability coefficient of 2 seconds/100 cm$^3$ (JIS P-8117) and a moisture permeability coefficient of 4000 g/m$^2$·24 hr (JIS L-1009 A-1) was prepared as a moisture retaining plate.

The frame 11 was made of PET with a thickness of 25 μm. A silicone rubber sheet with a thickness of 200 μm was prepared as a gas-liquid separation membrane.

A direct methanol fuel cell of an internal vaporization type having the structure shown in FIG. 1 was assembled by using the membrane electrode assembly 1, moisture retaining plate 13, frame 11 and gas-liquid separation membrane 10. Pure methanol (10 mL) with a purity of 99.9% by weight was stored in the fuel tank.

EXAMPLE 2

A cathode was heat-treated at 180° C. for 30 minutes in a $N_2$ atmosphere. The cathode was then immersed in 100% by weight of a methanol solution kept at 25° C. for 24 hours, and the weight loss ratio of the cathode catalyst layer was measured. It was confirmed from the measured ratio of 6% that perfluorocarbon sulfonic acid had an inverse micellar structure.

A direct methanol fuel cell of an internal vaporization type having the structure as shown in FIG. 1 was assembled in the same manner as described in Example 1, except that the above-mentioned cathode was used.

COMPARATIVE EXAMPLE

A direct methanol fuel cell of an internal vaporization type having the structure shown in FIG. 1 was assembled in the same manner as described in Example 1, except that no heat treatment was applied to the anode. Weight loss ratio of the anode catalyst layer was measured after immersing the anode in 100% by weight of a methanol solution kept at 25° C. for 24 hours. It was confirmed from the measured value of 70% that the perfluorocarbon sulfonic acid had a micellar structure.

Electricity was generated at room temperature under a constant load using the fuel cells obtained in Examples 1 and 2 and Comparative Example, and time-dependent changes of the cell power were measured. The results are shown in FIG. 2. In FIG. 2, the horizontal axis represents the elapsed time while the vertical axis represents the power. The power is represented by the ratio relative to the maximum power, which is the initial power of the fuel cell in Comparative Example, defined as 100. The elapsed time is represented as a relative time.

FIG. 2 shows that the range of power decrease of the fuel cells in Examples 1 and 2, which had the anode catalyst layer containing the conductive perfluoro-binder having the inverse micellar structure, was smaller than that of the fuel cell in Comparative Example, in which both binders of the anode catalyst layer and cathode catalyst layer had micellar structures.

In particular, the maximum power (initial power) of the fuel cell in Example 1, in which the binder of the anode catalyst layer had the inverse micellar structure and the binder of the cathode catalyst layer had the micellar structure, was increased as compared with the fuel cell in Example 2, in which both binders of the anode catalyst layer and cathode catalyst layer had the inverse micellar structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell comprising:
   a cathode catalyst layer;
   an anode catalyst layer comprising a conductive perfluoro-binder having an inverse micellar structure formed by outwardly orienting hydrophobic groups and inwardly orienting hydrophilic groups; and
   a proton conductive membrane provided between the cathode catalyst layer and the anode catalyst layer.

2. The fuel cell according to claim 1, wherein the cathode catalyst layer comprises a conductive perfluoro-binder having a micellar structure formed by outwardly orienting hydrophilic groups and inwardly orienting hydrophobic groups.

3. The fuel cell according to claim 2, wherein the cathode catalyst layer shows a weight loss of exceeding 10% after immersing the layer in 100% by weight of a methanol solution kept at 25° C. for 24 hours.

4. The fuel cell according to claim 1, wherein the cathode catalyst layer comprises a conductive perfluoro-binder having an inverse micellar structure formed by outwardly orienting hydrophobic groups and inwardly orienting hydrophilic groups.

5. The fuel cell according to claim 4, wherein the cathode catalyst layer shows a weight loss of 10% or less after immersing the layer in 100% by weight of a methanol solution kept at 25° C. for 24 hours.

6. The fuel cell according to claim 1, wherein the anode catalyst layer shows a weight loss of 10% or less after immersing the layer in 100% by weight of a methanol solution kept at 25° C. for 24 hours.

7. The fuel cell according to claim 1, wherein the conductive perfluoro-binder is a fluorinated resin having sulfonic acid groups.

8. The fuel cell according to claim I, further comprising a fuel which comprises methanol and is to be supplied to the anode catalyst layer.

9. The fuel cell according to claim 8, wherein a methanol concentration in the fuel is in the range from larger than 50 mol % to 100 mol % or less.

10. The fuel cell according to claim 1, made by a process comprising:
dispersing carbon black comprising a catalyst in a solution comprising the conductive perfluoro-binder to form a paste;
applying the paste to a porous carbon paper to form an anode; and
heating the anode to form the inverse micellar structure of the conductive perfluoro-binder.

11. The fuel cell according to claim 10, wherein the conductive perflouro-binder is present in said solution in an amount of from 10% to 70% by weight.

12. The fuel cell according to claim 10, wherein the conductive perflouro-binder is present in said solution in an amount of from 30% to 50% by weight.

13. The fuel cell according to claim 10, wherein said heating occurs at a temperature of from greater than 135° C. to 240° C.

14. The fuel cell according to claim 10, wherein said heating occurs at a temperature of from 180° C. to 200° C.

15. The fuel cell according to claim 1, wherein the anode catalyst layer comprises at least one member selected from the group consisting of Pt, a Pt alloy, Ru, a Ru alloy, Rh, a Rh alloy, Ir, an Ir alloy, Os, an Os alloy, Pd, and a Pd alloy.

16. The fuel cell according to claim 1, wherein the anode catalyst layer comprises a Pt-Ru alloy.

17. The fuel cell according to claim 1, wherein the conductive perfluoro-binder is represented by:

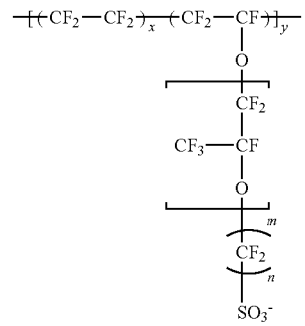

[chem 1]

where $x>0; y>0; m\geqq 0;$ and $n\geqq 0$.

18. The fuel cell according to claim 1, wherein the anode catalyst present in the anode catalyst layer in an amount of from 5% to 50% by weight and wherein the conductive perfluoro-binder is present in an amount of from 1% to 20% by weight relative to the weight of the anode catalyst layer.

19. The fuel cell according to claim 1, wherein the anode catalyst present in the anode catalyst layer in an amount of from 10% to 30% by weight and wherein the conductive perfluoro-binder is present in an amount of from 5% to 15% by weight relative to the weight of the anode catalyst layer.

20. A fuel cell comprising:
a cathode catalyst layer comprising a conductive perfluoro-binder having a micellar structure formed by outwardly orienting hydrophilic groups and inwardly orienting hydrophobic groups;
an anode catalyst layer comprising a conductive perfluoro-binder having an inverse micellar structure formed by outwardly orienting hydrophobic groups and inwardly orienting hydrophilic groups; and
a proton conductive membrane provided between the cathode catalyst layer and the anode catalyst layer, wherein the cathode catalyst layers shows a weight loss of exceeding 10% after immersing the layer in 100% by weight of a methanol solution kept at 25° C. for 24 hours, and the anode catalyst layer shows a weight loss of 10% or less after immersing the layer in 100% by weight of a methanol solution kept at 25° C. for 24 hours.

* * * * *